Jan. 18, 1955
N. CSVERCSKO ET AL
2,699,705
SCREEN SUPPORT
Filed Jan. 5, 1952
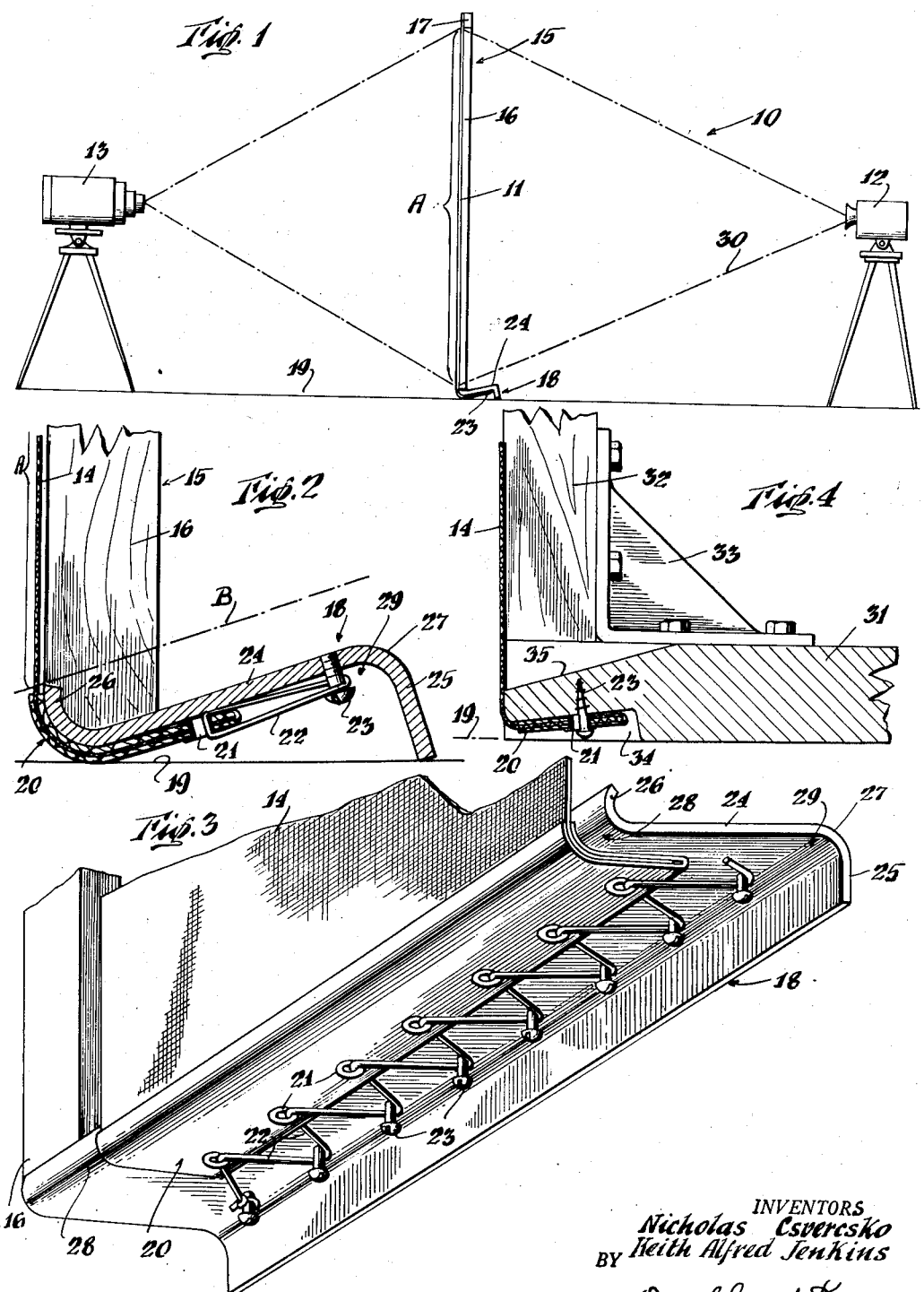
INVENTORS
Nicholas Csvercsko
BY Keith Alfred Jenkins
Duell and Kane
ATTORNEYS

United States Patent Office 2,699,705
Patented Jan. 18, 1955

2,699,705

SCREEN SUPPORT

Nicholas Csvercsko, Passaic, N. J., and Keith Alfred Jenkins, New York, N. Y., assignors to Trans-Lux Corporation, New York, N. Y., a corporation of Delaware Application January 5, 1952, Serial No. 265,082

4 Claims. (Cl. 88—28.93)

This invention relates to a projection system, and more particularly to the support of a screen in such a system.

It is an object of this invention to provide a projection system in which an image is presented for reception by a camera, such as may be used in a television studio.

It is a further object to provide a screen upon which an image is projected so as to extend as closely to the supporting floor or other surface as possible.

It is a still further object to furnish a viewing screen which has a large translucent area extending close to the supporting floor and held under tension.

Among other objects of the invention are those of providing a base upon which a screen is supported close to the supporting floor and upon which a translucent sheet is held under tension and in having the assembly have relatively few and rugged parts.

With these and other objects in mind reference is had to the attached sheet of drawings showing practical embodiments of the invention and in which:

Figure 1 is a side elevation of a projection and receiving system of this invention;

Figure 2 is a side section of the lower end of the screen and frame;

Figure 3 is a bottom perspective of a portion of the assembly as shown in Figure 1; and Figure 4 is a side section of an alternative structure.

In general, this invention provides a system for projecting a light image on a translucent screen, the bottom edge of which image is so close to the supporting floor as to apparently be contiguous therewith to the eye or the mechanism which views the image.

In Fig. 1, a system 10 is shown made up of a frame and translucent screen assembly 11, an image projector 12, and a pick-up camera 13. A translucent sheet 14 (Figs. 2 and 3) is mounted on a frame 15. The frame 15 is composed of a pair of vertical members 16, a horizontal top member 17, and a horizontal floor member 18. Conveniently the floor member 18 supports the vertical members 16, while the top member 17 is supported upon and extended across between the vertical members 16. The entire screen assembly 11 is mounted on a deck surface 19 upon which the floor member 18 rests. In Fig. 1, only one vertical member 16 is shown. It will be understod that a corresponding second vertical member forms the rectangular frame 15 with the members 16, 17, and 18, which are shown. The center of this frame 15 is open and across this open space is stretched the translucent sheet 14. The sheet 14 extends from the top member 17 to the floor member 18 and from one vertical member 16 to the other.

The translucent sheet 14 is mounted on the frame 15 by means of a peripheral webbing 20, shown in Figs. 2 and 3, which is provided with grommets 21. A lacing 22 or elastic band, passing through the grommets 21, engages the webbing 20. The lacing 22 is looped over studs 23 provided on the members 16, 17, and 18 of the frame 15 to thereby secure the sheet 14 to the frame 15. By drawing the lacing 22 tight on the studs 23, the sheet 14 is drawn taut on the frame 15. Thus, the sheet 14 is mounted on the frame 15 under tension so that it provides a flat plane surface.

As shown in Figs. 2 and 3, the vertical member 16 is mounted on and raised from the floor beam 18 which provides a base for the screen assembly 11. Thus supported, it rests on the floor surface 19 and rises vertically therefrom. The floor member 18, which supports the assembly 11 and also anchors the lower edge of the sheet 14, is shown to be of a modified S-shape in the embodiment of the invention as in Figs. 1, 2, and 3. Thus shaped, it is an integral member shaped embracing three portions. These are a central section 24, a right angle portion 25, and a curved edge portion 26. A right angle bend 27 joins the flange 25 to the central section 24. As seen in the figures, the effect of the flange 25 thus extending from the central section 24 is to tilt the section 24 with relation to the floor surface 19. The curved edge 26 is formed to provide a nose 28 on the lower surface of the member 18 and to the side of the central section 24. The nose 28 with the screen binding interposed rests on the floor surface 19. Thus, the central section 24 tilts downward in the direction of the curved edge 26. Correspondingly, the side of the section 24 adjacent the right angle bend 27 is raised from the floor surface 19 a substantial amount so as to provide a recess or cavity 29 between the floor surface 19, the flange 25, and the section 24. The studs 23 on the underside of the member 18 extend into this cavity 29. The webbing 20 on the lower edge of the sheet 14 is drawn around the nose 28 with the section carrying the grommets extending depthwise of the frame 15 into the cavity 29. The lacing 22 on the lower edge of the sheet 14 extends depthwise of the frame, also, between the grommets 21 and the studs 23. The lower edge of the sheet 14 is tightened on the member 18 by shortening the lacing 22 depthwise of the frame 15. The effect of this pulling up on the lacing 22 draws the webbing 20 around the nose 28 and the webbing 20, thus tensioned, pulls downward vertically on the sheet 14 to draw it taut in the vertical direction.

The frame 15 has a narrow depth and relatively great vertical and horizontal dimensions. The assembly 11, therefore, is supported in its vertical position on the floor member 18 which provides for depthwise stability. Referring to Fig. 1, the projector 12 casts a light beam 30 which is focused to fill the open area A of the translucent sheet 14. The pick-up camera 13 is focused to view this area A and the picture projected thereon from projector 12. The area A is maintained in a vertical dimension by the depthwise stability of the floor member 18. Referring to Fig. 2, a dotted line B indicates the lower limit of the diverging beam from the projector 12. This lower limit travels downward toward the floor surface 19 as it approaches the translucent sheet 14 and strikes the sheet close to the rounded edge 26 of the floor member 18. The lower edge of the area A is consequently carried down to a point approximately at the level of the curved edge 26. This level of edge 26 and the lower edge of the area A is an imperceptible distance above the floor surface 19, as viewed by the pick-up camera 13.

It will be noted that the floor member 18 extends from the projector side of the screen assembly 11. Also, the tilted profile of the cross section of the member 18 conforms generally to the path of the lower limit B of the diverging beam from projector 12. The effect of this arrangement is to provide the stable structure of member 18 without interfering with the lower limit B of the diverging beam.

In operation, the projection and pick-up system of this invention provides for the focusing of eight images on a screen, in such a way as to make imperceptible the difference between the lower edge of the projected image and the supporting surface upon which the screen assembly 11 is disposed. This is of particular value in televising and in photographic studios. For example, if as part of a television program it is desired to produce a projected background on the screen 14, before which live action is to take place, it is of great value to have the displayed background appear to be as real as possible. One of the problem in the attainment of such apparent reality is the projection of the lower edge of the image at floor level. With the projection and pick-up system of this invention this illusion of reality is readily achieved. At the same time the necessary structure for holding the projection screen in place and under real tension is also preserved.

In Fig. 4 an alternative structure is shown in which a lower member 31 supports a vertical member 32, and on which the webbing 20 of the sheet 14 is held. The member 31 lies horizontally and extends across the bottom of the screen assembly 11. The vertical member 32 is supported at the end of the member 31. An angle iron 33 holds the member 32 upright. The member 31 runs lengthwise of the screen assembly 11. Its short sectional dimension is in the vertical dimension of that assembly 11. The angle iron 33 is fastened to the upper surface of the member 31 and to one side of the member 32. That member bears on the member 31 along one side thereof, and is held in this position by the angle iron. The sheet 14 is extended over the frame 15 of the screen assembly adjacent the member 32. Along the bottom edge of the member 31, a recess or cavity 34 is provided into which the webbing 20 can be drawn. In this cavity studs 23 are anchored in the member 31, and the grommets 21 of the sheet 14 hook over these studs to secure the lower edge of the sheet 14.

A surface 35, at the screen side of the member 31, slopes downwardly towards the screen from the projector side of the member 31. The rays projected onto the screen assembly 11 fan out or diverge. The slope 35 allows these diverging rays to approach the sheet 14 at their normal angle and increases the image area on the sheet 14. The webbing 20 is pulled over the nose of the member 31 adjacent the cavity 34. The nose of member 31 acts in the same manner as the nose 28 of the member 18 to snub the sheet 14 as it is drawn tight on the studs 23. With the sheet 14 thus drawn, the image projected on the sheet 14 is brought close enough to the supporting surface 19 so as to be apparently contiguous thereto when viewed by appropriate pickup means, such as a camera. The operation of the structure as shown in Fig. 4 is thus similar to the operation of the invention as shown in the embodiment of Figs. 1 through 3. It will be understood that other modifications of the floor member may be made.

It is, therefore, an advantage of this invention that the image projected upon the screen of this assembly is not cut off a substantial distance above the surface upon which the screen is supported. This advantage is important in that it enhances the realism of live action which takes place in front of such a projected image. Another advantage is the support for the screen assembly 11 provided by the S-shaped member. The invention is also desirable in providing a device which pulls the webbing on the lower edge of the sheet 14 in a more or less horizontal direction, and thus reduces the height of the necessary frame on the bottom of the screen. The S-shaped member is advantageous also because of the depthwise support that it provides the frame 15. The depthwise slope of this member is desirable in conforming to the diverging rays from the projector. As illustrated the present teachings will ordinarily be employed in connection with a screen support which extends immediately adjacent a floor such as also supports the camera. However, it will be appreciated that this invention may advantageously be utilized to have the zone of light images extend to points immediately adjacent surfaces other than those which are horizontal and support the camera. For example, the ceiling and side walls might have the supporting member 17 or 31 lying in contact with them.

Thus, among others, the several objects of the invention as specifically aforenoted are achieved. Obviously, numerous changes in construction and rearrangement of the parts might be resorted to without departing from the spirit of the invention as defined by the claims.

We claim:

1. A background projection screen comprising the combination of a floor member, frame members supported on the forward portion of the ends of said floor member and extending vertically therefrom, a sheet of flexible material supported by said frame members, said floor member being of substantially uniform cross section transverse to its lengthwise dimension and including a forwardly inclined central section, a forward edge portion curved upwardly from said central section and arranged in the plane of the forward faces of the frame members, and a flange portion extending downwardly from a rearward portion of the central section to engage a floor surface, whereby a lengthwise recess is formed beneath the base member by the central section and the flange portion, the lower end of said sheet being drawn around said curved edge portion and extending into said recess, and means to secure the end of the sheet to said central section.

2. A background projection screen as defined in claim 1 wherein the last recited means comprises a plurality of studs embedded in the central section, a plurality of grommets secured to said sheet, and lacing means interconnecting said studs and grommets.

3. A background projection screen as defined in claim 2 wherein the lower end of said sheet is covered by a protective webbing, said webbing covering that area of the sheet that is drawn around said curved edge portion and including that through which said grommets are secured.

4. In a projection system, a frame for a translucent projection screen in said system, an S-shaped member supporting said frame and said screen on a floor surface, a curved edge of said supporting member positioned beneath said frame with the convex side of the curved portion abuttable against a supporting surface, a second curved edge of said supporting member positioned with the concave side of the curved edge faceable against said floor surface, an outer periphery of said second edge abuttable against said floor surface, whereby said member has its minimum dimension directly beneath said frame and screen and has a cavity running lengthwise of the member and positioned rearwardly of the first mentioned edge of the member.

References Cited in the file of this patent

UNITED STATES PATENTS

| | | |
|---|---|---|
| 1,594,951 | Headding et al. | Aug. 3, 1926 |
| 1,933,854 | Jelinek | Nov. 7, 1933 |
| 2,055,862 | Friedman | Sept. 29, 1936 |
| 2,260,299 | Cunningham et al. | Oct. 28, 1941 |
| 2,379,499 | Smith | July 3, 1945 |

FOREIGN PATENTS

| | | |
|---|---|---|
| 188,111 | Great Britain | Nov. 9, 1922 |
| 670,611 | Germany | Jan. 23, 1939 |
| 907,295 | France | June 18, 1945 |